(12) United States Patent
Zheng et al.

(10) Patent No.: US 9,181,919 B2
(45) Date of Patent: Nov. 10, 2015

(54) PLASMA OIL-FREE IGNITION SYSTEM IN OXYGEN ENRICHED ENVIRONMENT

(76) Inventors: Lu Zheng, Shanghai (CN); Jianwen Zhang, Shanghai (CN); Yang Zhao, Shanghai (CN); Yuehua Li, Shanghai (CN)

( * ) Notice: Subject to any disclaimer, the term of this patent is extended or adjusted under 35 U.S.C. 154(b) by 317 days.

(21) Appl. No.: 13/808,108

(22) PCT Filed: Feb. 16, 2012

(86) PCT No.: PCT/CN2012/071195
§ 371 (c)(1),
(2), (4) Date: Jan. 3, 2013

(87) PCT Pub. No.: WO2013/056524
PCT Pub. Date: Apr. 25, 2013

(65) Prior Publication Data
US 2013/0333676 A1    Dec. 19, 2013

(51) Int. Cl.
*F02P 23/00* (2006.01)
*F23Q 7/02* (2006.01)
*F23D 1/00* (2006.01)

(52) U.S. Cl.
CPC . *F02P 23/00* (2013.01); *F23D 1/00* (2013.01); *F23Q 7/02* (2013.01); *F23D 2207/00* (2013.01); *Y02E 20/322* (2013.01); *Y02E 20/344* (2013.01)

(58) Field of Classification Search
CPC .............. F02P 23/00; F23Q 7/02; F23D 1/00; F23D 2207/00; F23D 2201/101; F23D 2201/20; F23D 2201/30; F23D 14/22; F23D 14/32; F23D 1/02; Y02E 20/344; Y02E 20/322; F23C 5/08; F23C 6/04; F23C 2201/10; F23C 2900/03005
See application file for complete search history.

(56) References Cited

U.S. PATENT DOCUMENTS

2007/0254251 A1 * 11/2007 Cao et al. .......................... 431/10

* cited by examiner

*Primary Examiner* — Alfred Basichas
(74) *Attorney, Agent, or Firm* — Houtteman Law LLC (57) ABSTRACT

A plasma oil-free ignition system in oxygen enriched environment comprises a plasma generator and a burner. The plasma oil-free ignition system comprises a sleeve group coaxially arranged with the burner, and the sleeve group comprises multiple coaxially sleeved sleeves. Annular spaces are formed between adjacent sleeves and between the sleeves and the burner. Oxygen ducts are arranged on the sleeves, and oxygen ducts are arranged on the burner. Plasmas jetted by the plasma generators form a local high temperature zone filled with high temperature plasma and pulverized coal air flow. A certain amount of oxygen is fed to the burner through the oxygen duct therein to form local oxygen enriched zones in the annular spaces and the subsequent adjacent spaces through which air flows, thus realizing oxygen enriched combustion of volatile matters or coke or mixture thereof, and combustion the pulverized coal air flow more intensely to release more heat so as to ignite the primary air pulverized coal air flow quickly and burn the pulverized coal air flow stably. The invention has simple structure, is applicable to different coal types, especially applicable to the plasma oil-free ignition system in oxygen enriched environment of coal types with low volatile matters.

10 Claims, 11 Drawing Sheets

PLASMA OIL-FREE IGNITION SYSTEM IN OXYGEN ENRICHED ENVIRONMENT

FIELD OF THE INVENTION

The invention belongs to the field of thermodynamic boilers, and relates to boiler fittings, in particular to a plasma oil-free ignition system in oxygen enriched environment.

DESCRIPTION OF THE RELATED ART

The conventional power station boilers are commonly ignited by oil guns. For ignition starting of a boiler, an oil gun is ignited, and a furnace is heated to ignition temperature of pulverized coal air flow after oil is burnt in the furnace for a certain time, and pulverized coal is blown into the furnace for mixed combustion of oil and coal. When the load of the boiler is more than 50% and the pulverized coal air flow can be burnt stably, fuel oil is gradually removed to finish the ignition starting process of the boiler. In order to save cost and reduce the fuel oil consumption of the power station boilers, a lot of foreign and domestic companies have developed plasma oil-free ignition technologies which have been widely applied to a great amount of power station boilers.

However, steam coals from different places in China differ greatly in terms of quality, and plasma ignition has some disadvantages in practice:

Firstly, the plasma ignition technology has higher requirements for coal quality. At present, plasma ignition has been successfully applied to a great amount of domestic power station boilers with bituminous coal as steam coal, and the cause for this is that bituminous coal has higher dry ash-free basis volatile matter content (generally 30%-35%), and the pulverized coal air flow is easily ignited. However, the plasma ignition technology is poorly adaptable to coal with low volatile matter content like anthracite, meager coal and poor bituminous coal. Successful application of the plasma ignition technology is seldom reported for meager coal boilers in China, and the successful application of the plasma ignition technology to anthracite boilers has not been reported at present.

Secondly, during boiler ignition, energy of plasma generators is generally about 100-200KW, which is not enough to ignite all pulverized coal. Practices show that the boilers subject to the plasma ignition technology experience high carbon content of fly ash at initial starting stage, and a large amount of pulverized coal is not burnt out, especially the coal difficult to be bunt out has worse burnout performance. Unburnt pulverized coal is easy to accumulate at corrugated plates of air preheaters or catalyst injection places of SCR reactors, thus easily resulting in secondary combustion of the unburnt pulverized coal and further causing major accidents and economic losses;

Thirdly, during boiler ignition, for ensuring stable ignition of the pulverized coal, generally the pulverized coal with higher concentration is used during actual operation, causing higher load and larger temperature rise speed of the boilers during starting, which easily gives rise to overtemperature at steam sides and results in accidents like bursting of pipes of superheaters due to overtemperature.

SUMMARY OF THE INVENTION

The invention provides a plasma oil-free ignition system in oxygen enriched environment with simple structure and wide applicability to coal types and especially suitable for coal types with low volatile matters.

In order to achieve the purpose, the invention provides a plasma oil-free ignition system comprising a plasma generator and a burner in oxygen enriched environment. The plasma oil-free ignition system comprises a group of sleeves arranged in the burner, and the sleeve group is coaxially arranged with the burner.

The plasma generator is coaxially or radially inserted into the sleeve group.

The sleeve group comprises multiple coaxially sleeved sleeves, and the sleeve group comprises at least one sleeve.

Cross sections of the sleeves are circular or rectangular.

Annual spaces are formed between adjacent sleeves and between the sleeves and the burner. Annular spaces with different length or thickness are formed according to different coal types and coal quality, multiple sleeves with identical or different lengths, and different position combinations of the sleeves. Pulverized coal air flow and oxygen are fully mixed in the annular spaces, thus facilitating full ignition of the pulverized coal air flow in the burner.

Oxygen ducts are arranged on the sleeves, and oxygen ducts are arranged on the burner, and the oxygen ducts can act as pulverized coal concentration rings. Oxygen enters the annular spaces between the sleeves and between the sleeves and the burner, and local oxygen enriched zones are formed in the annular spaces and the subsequent adjacent spaces through which air flows, which intensifies combustion of the pulverized coal air flow.

The oxygen ducts are arranged at the side toward direction of the pulverized coal air flow.

Cross sections of the oxygen ducts are circular, oval, rhombic, triangular, wedged or trapezoidal.

Walls of the oxygen ducts toward the direction of the pulverized coal air flow are planes or arc walls.

A wear resistant metal, or wear resistant ceramics or a wear resistant cast steel material is overlaid to walls of the oxygen ducts toward the direction of the pulverized coal air flow to prevent wear and protect service life of the oxygen ducts.

Walls of the oxygen ducts against the direction of the pulverized coal air flow are provided with multiple annular grooves, or provided with multiple openings or multiple oxygen nozzles. Oxygen enters the burner through the annular grooves, the openings and the oxygen nozzles to mix with pulverized coal.

An angle of 0°-80° is formed between injection direction of the oxygen nozzles and flow direction of the pulverized coal air flow. The flow direction of oxygen is different from that of the pulverized coal air flow, which can generate proper disturbance so as to facilitate full mixing of oxygen and the pulverized coal air flow.

A back air flow oxygen duct is arranged at a nozzle of the burner. The back air flow oxygen duct is directly communicated with a furnace directly, and oxygen enters the furnace through the back air flow oxygen duct. A local oxygen enriched combustion zone is formed at the nozzle of the burner by supplying oxygen, thus intensifying the combustion of the pulverized coal air flow in the burner and the furnace.

Wall of the back air flow oxygen duct toward direction of the furnace is provided with multiple annular grooves, or provided with multiple openings or multiple oxygen nozzles. Oxygen enters the furnace through the annular grooves or the openings or the oxygen nozzles to support combustion, and a local oxygen enriched combustion zone is formed at the nozzle of the burner, thus intensifying the combustion of the pulverized coal air flow in the burner and the furnace, improving thermal load of the wall of the combustion zone, increasing burnout rate of the pulverized coal and reducing fire suppression possibility of the boiler.

Flow of oxygen in the oxygen ducts is adjustable. According to different coal types and coal quality, the amount of oxygen injected into the annular spaces between the sleeves is adjusted so as to adjust oxygen enriched concentration in different local oxygen enriched zones in the burner and control combustion strength of different local oxygen enriched zones in the burner, thus ensuring the pulverized coal air flow is burnt in a controlled way in the burner and protecting the burner from burnout when a large amount of heat is released.

Air, nitrogen or carbon dioxide can be fed to the oxygen ducts. After ignition of the boiler, the oxygen ducts are purged to prevent blocking by pulverized coals or ash.

In the burner of the invention, the plasma jetted by the plasma generator form a local high temperature zone filled with high temperature plasma and pulverized coal air flow. Under action of the high temperature plasma, pulverized coal particles release volatile matters quickly. Oxygen contained in air carrying pulverized coal chemically reacts with the volatile matters, burns quickly and releases heat. At this time, a certain amount of oxygen is fed into the burner through the oxygen ducts in the burner to form a local oxygen enriched zone, thus realizing oxygen enriched combustion of the volatile matters or coke or mixture thereof, and combustion the pulverized coal air flow more intensely to release more heat, igniting primary air pulverized coal air flow quickly and burning the primary air pulverized coal air flow stably.

The invention has the following advantages: power station boilers can be ignited without fuel oil at all, and the pulverized coal air flow can be ignited directly. Steam coal characterized by typical inferior coal properties like low volatile matters, low calorific value and high ash content can be directly ignited by the burner of the invention, and has high burnout rate. The burner of the invention can be served as the ignition burner of the boiler, and also can be served as the main burner of the boiler. The invention is characterized by simple structure, rational design, moderate investment and operation cost and high cost-performance ratio.

DESCRIPTION OF THE PREFERRED EMBODIMENTS

The invention is described in detail as follows in combination with preferred embodiments according to FIG. 1 to FIG. 12.

Embodiment 1

Figure 1:
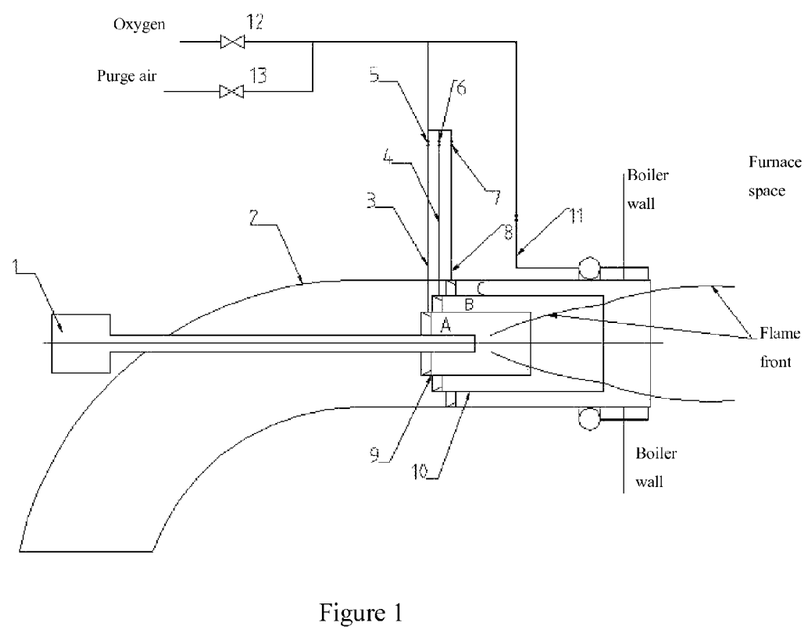
FIG. 1 is a structural diagram (axial arrangement) of the plasma oil-free ignition system provided by the invention.
Figure 3:
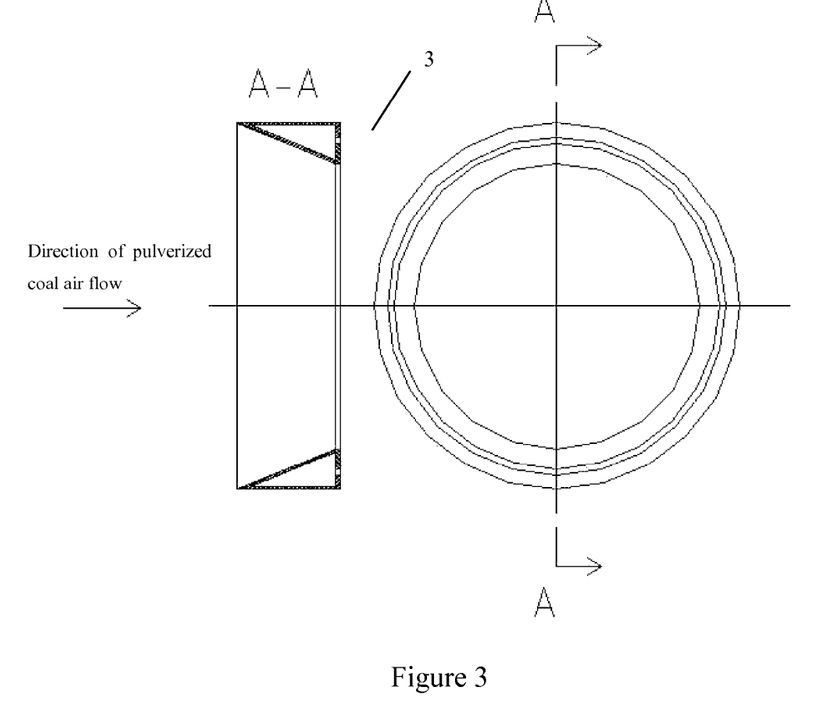
FIG. 3 is a section view of the oxygen duct structure.
Figure 4:
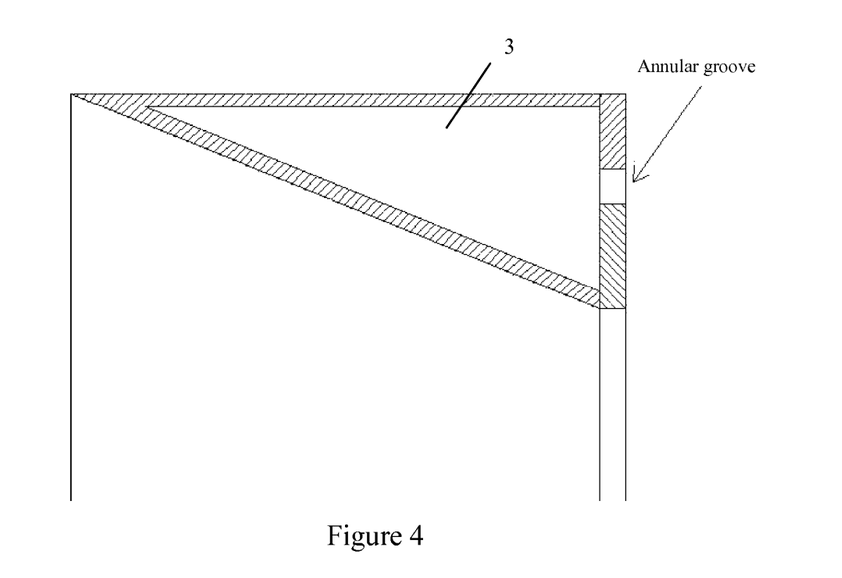
FIG. 4 is an enlarged view of the oxygen duct structure.

As shown in FIG. 1, FIG. 3 and FIG. 4, the invention provides a plasma oil-free ignition system in oxygen enriched environment which comprises a plasma generator 1 and a burner 2. The burner 2 comprises a sleeve 9 and a sleeve 10 therein, and the plasma generator 1, the burner 2, the sleeve 9 and the sleeve 10 are arranged coaxially. An annular space A exists between the sleeve 9 and the plasma generator 1, and an oxygen duct 3 is arranged on the inner wall at the left end of the sleeve 9. Besides providing oxygen, the oxygen duct 3 also acts as a pulverized coal concentration ring. A wear resistant metal is overlaid to wall of the oxygen duct 3 toward direction of pulverized coal air flow. Wall of the oxygen duct 3 against the direction of the pulverized coal air flow is provided with an annular groove 101. Oxygen enters the annular space A through the annular groove 101 to mix with pulverized coal so as to form local oxygen enriched zones in the annular space A and adjacent zones. An annular space B exists between the sleeve 10 and the sleeve 9, and an oxygen duct 4 is arranged on the inner wall at the left end of the sleeve 10. An annular space C exists between the sleeve 10 and the burner 2, and an oxygen duct 8 is arranged on the inner wall of the burner 2. Similar to the oxygen duct 3, outer pipe walls of an oxygen duct 4 and an oxygen duct 8 toward the direction of the pulverized coal air flow can act as pulverized coal concentration rings, and walls of the oxygen duct 4 and the oxygen duct 8 against the direction of the pulverized coal air flow are provided with an annular groove 101. Similarly, pulverized air flow and oxygen can fully mix in the annular space B and the annular space C to form local oxygen enriched zones in the annular space B, the annular space C and the adjacent zones.

When the plasma oil-free ignition system works, the pulverized coal air flow enters the burner 2 and is divided into 3 parts to enter the annular space A, the annular space B and the annular space C. The plasma generator 1 generates high temperature plasma which forms a local high temperature zone in the sleeve 9. Pulverized coal particles are thermally cracked quickly and release volatile matters which burn quickly. A local oxygen enriched zone can be formed in the sleeve 9 by changing opening of a control valve 5 to further promote combustion of the pulverized coal air flow. Local oxygen enriched zones can be formed in the annular space B, the annular space C and the adjacent spaces by changing opening of a control valve 6 and opening of a control valve 7 so as to promote quick combustion of pulverized coal, thus controlling oxygen enriched degree of the local oxygen enriched zones and controlling combustion strength of pulverized coal in the burner at the same time. A back air flow oxygen duct 11 is arranged at a nozzle of the burner 2, and wall of the back air flow oxygen duct 11 toward a furnace is provided with an annular groove 101. Oxygen is sprayed into the furnace through the annular groove 101 to support combustion, and a local oxygen enriched combustion zone is formed at the nozzle of the burner, thus intensifying combustion of the pulverized coal air flow in the furnace, improving thermal load of the wall of the combustion zone, increasing burnout rate of the pulverized coal and reducing fire suppression possibility of the boiler, finally igniting the primary air flow quickly and burning the primary air flow stably.

When the plasma ignition burner is used as a main burner after the ignition process, an oxygen valve 12 is closed and a purge air valve 13 is opened to allow the purge compressed air to pass through the oxygen ducts and purge the oxygen ducts and the annular grooves 101, thus preventing blockage of the oxygen ducts by pulverized coal or ash. Nitrogen or carbon dioxide can be used as the purge medium.

Embodiment 2

Figure 2:
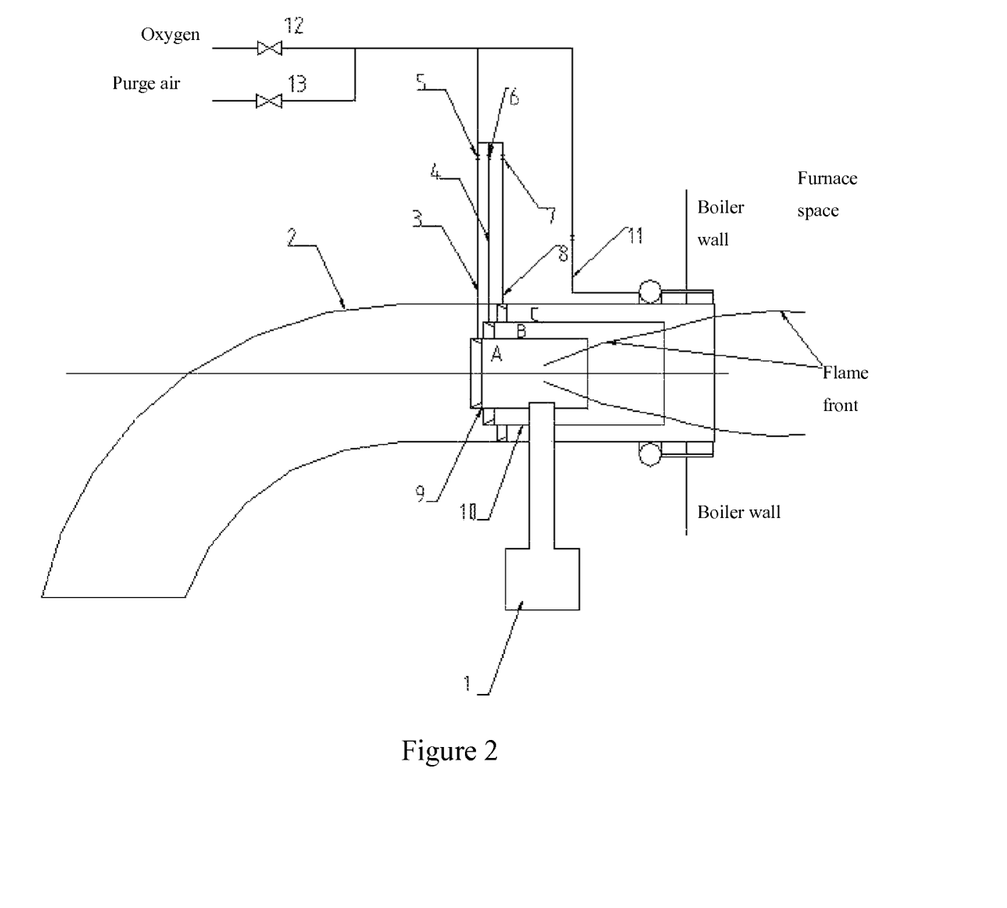
FIG. 2 is a structural diagram (radial arrangement) of the plasma oil-free ignition system provided by the invention.

As shown in FIG. 2, FIG. 3 and FIG. 4, the distinction between the embodiment and the embodiment 1 is that the plasma generator is inserted into the plasma burner from the radial direction of the burner 1, and the sleeve 9 is filled with the high temperature plasmas jetted by the plasma generator.

Embodiment 3

Figure 5:
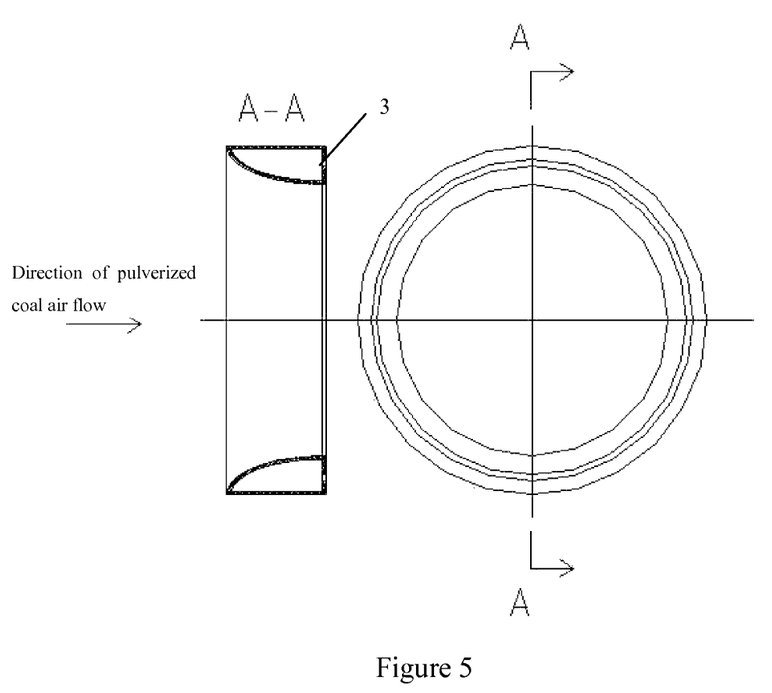
FIG. 5 is a section view of the oxygen duct structure.

As shown in FIG. 5, the distinction between the embodiment and the embodiment 1 is that cross sections of the oxygen ducts 3, 4 and 8 are triangular, and their walls toward the direction of the pulverized coal air flow are arc walls; and walls of the oxygen ducts 3, 4 and 8 against the direction of the pulverized coal air flow are provided with annular grooves 101, and oxygen enters the burner through the annular grooves 101 to mix with pulverized coal.

Embodiment 4

Figure 6:
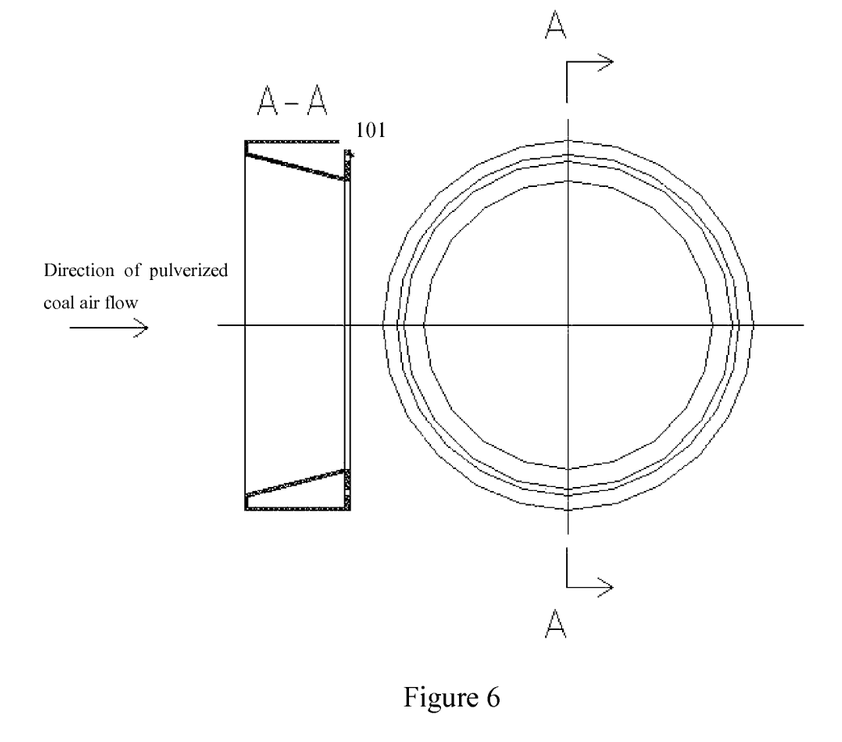
FIG. 6 is a section view of the oxygen duct structure.

As shown in FIG. 6, the distinction between the embodiment and the embodiment 1 is that cross sections of the oxygen ducts 3, 4 and 8 are trapezoidal, walls of the oxygen ducts 3, 4 and 8 against the direction of the pulverized coal air flow are provided with annular grooves 101, and oxygen enters the burner through the annular grooves 101 to mix with pulverized coal.

Embodiment 5

Figure 7:
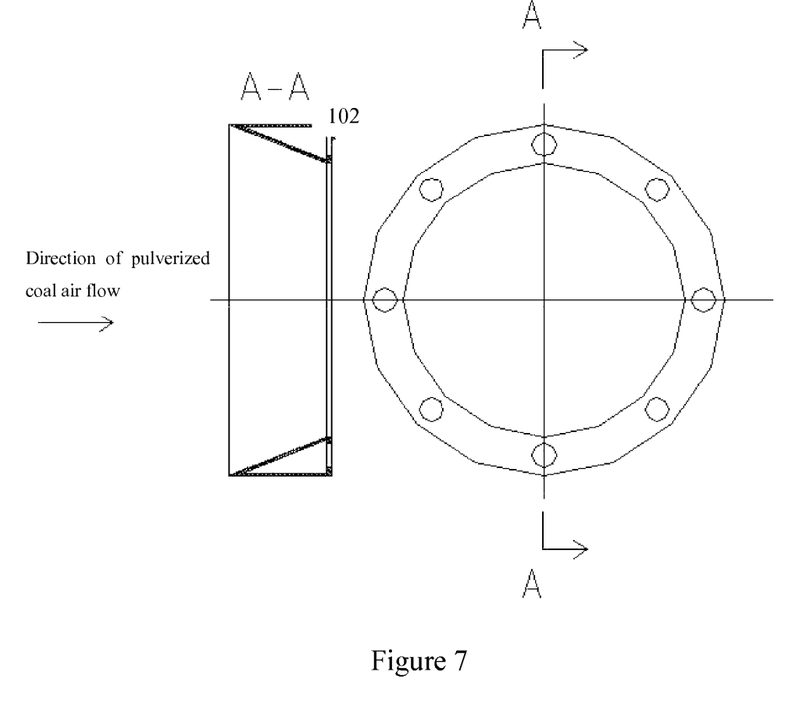
FIG. 7 is a section view of the oxygen duct structure.

As shown in FIG. 7, the distinction between the embodiment and the embodiment 1 is that walls of the oxygen ducts 3, 4 and 8 against the direction of the pulverized coal air flow are provided with eight oxygen openings 102, and oxygen enters the burner through the oxygen openings 102 to mix with pulverized coal.

Embodiment 6

Figure 8:
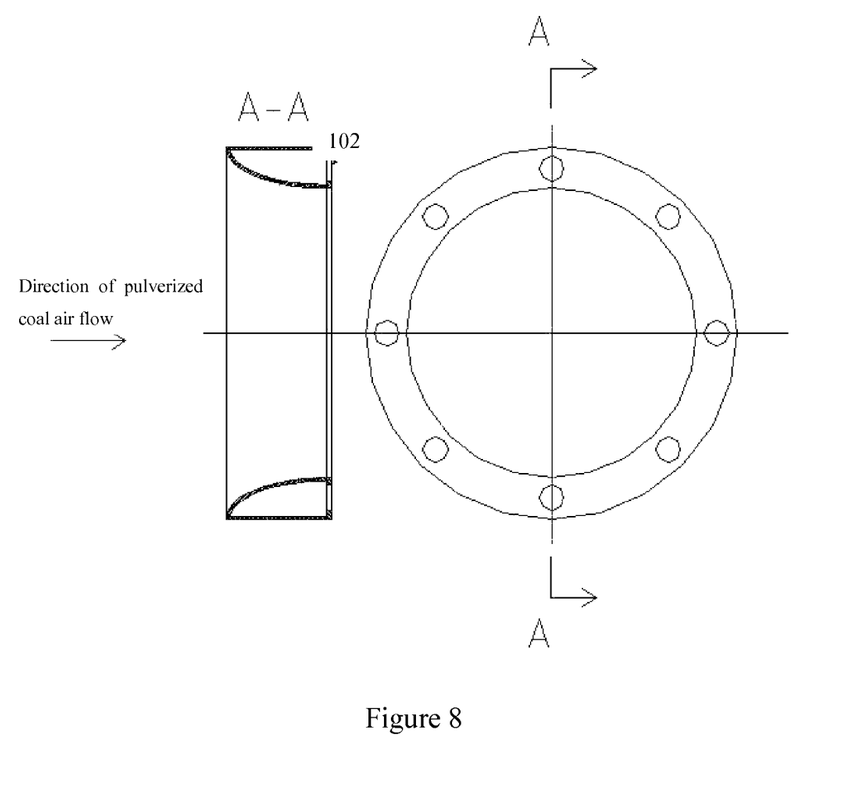
FIG. 8 is a section view of the oxygen duct structure.

As shown in FIG. 8, the distinction between the embodiment and the embodiment 1 is that cross sections of the oxygen ducts 3, 4 and 8 are triangular, and their walls toward the direction of the pulverized coal air flow are arc walls; and walls of the oxygen ducts 3, 4 and 8 against the direction of the pulverized coal air flow are provided with eight oxygen openings 102, and oxygen enters the burner through the oxygen openings 102 to mix with pulverized coal.

Embodiment 7

Figure 9:
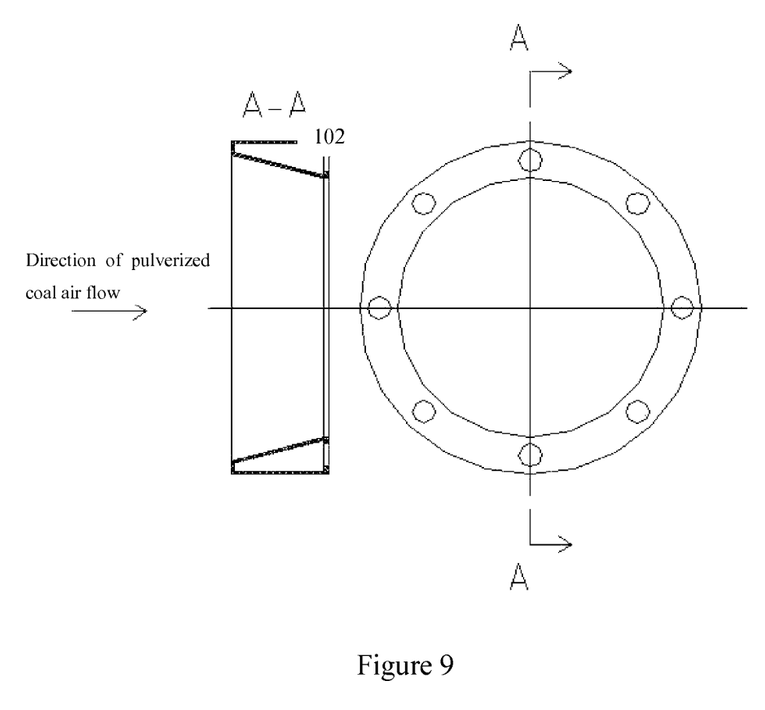
FIG. 9 is a section view of the oxygen duct structure.

As shown in FIG. 9, the distinction between the embodiment and the embodiment 1 is that cross sections of the oxygen ducts 3, 4 and 8 are trapezoidal, walls of the oxygen ducts 3, 4 and 8 against the direction of the pulverized coal air flow are provided with 8 oxygen openings 102, and oxygen enters the burner through the oxygen openings 102 to mix with pulverized coal.

Embodiment 8

Figure 10:
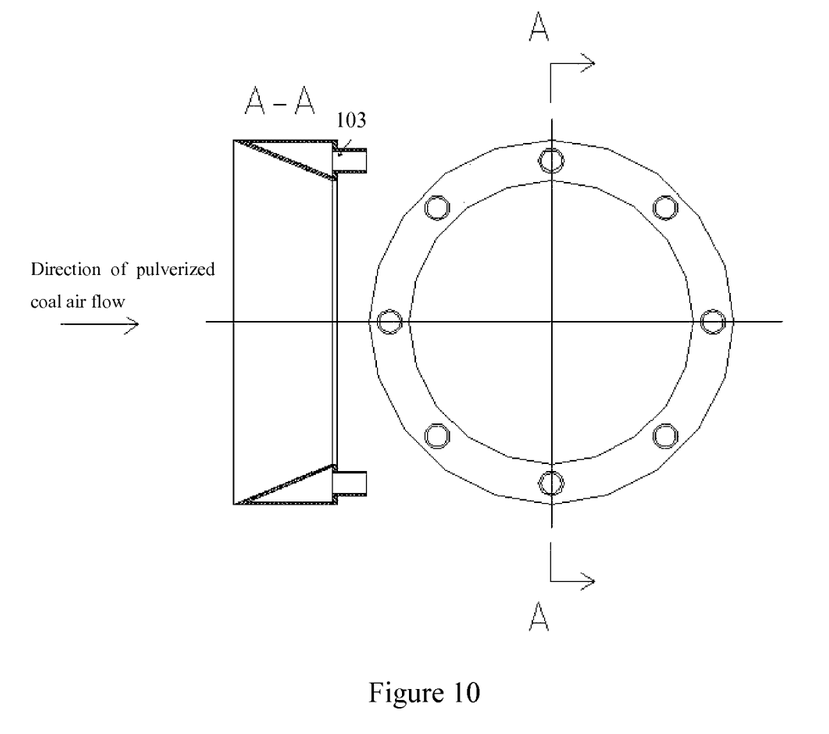
FIG. 10 is a section view of the oxygen duct structure.

As shown in FIG. 10, the distinction between the embodiment and the embodiment 1 is that walls of the oxygen ducts 3, 4 and 8 against the direction of the pulverized coal air flow are provided with eight oxygen nozzles 103, and oxygen enters the burner through the oxygen nozzles 103 to mix with pulverized coal.

Embodiment 9

Figure 11:
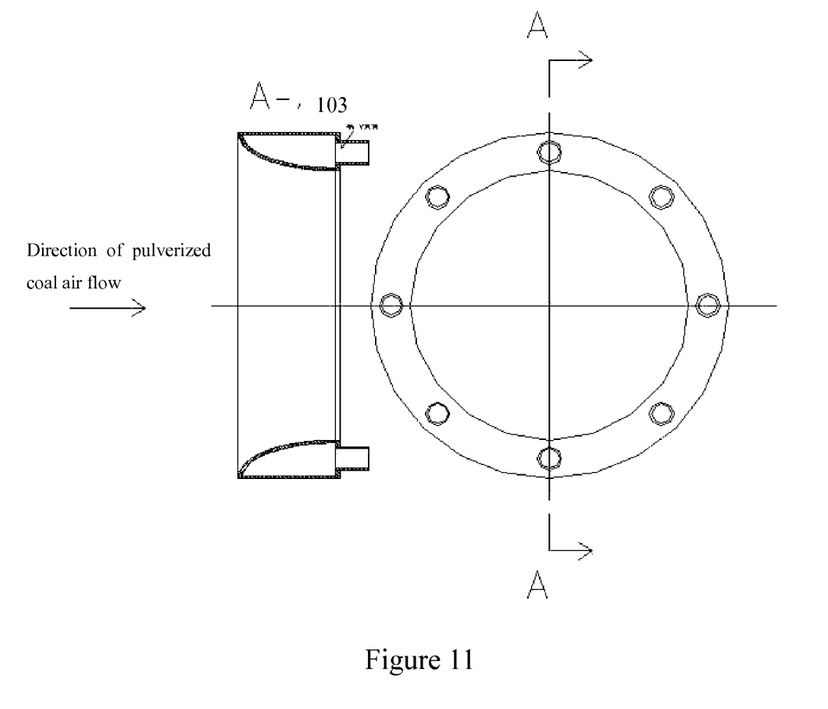
FIG. 11 is a section view of the oxygen duct structure.

As shown in FIG. 11, the distinction between the embodiment and the embodiment 1 is that cross sections of the oxygen ducts 3, 4 and 8 are triangular, and their walls toward the direction of the pulverized coal air flow are arc walls; and walls of the oxygen ducts 3, 4 and 8 against the direction of the pulverized coal air flow are provided with eight oxygen nozzles 103, and oxygen enters the burner through the oxygen nozzles 103 to mix with pulverized coal.

Embodiment 10

Figure 12:
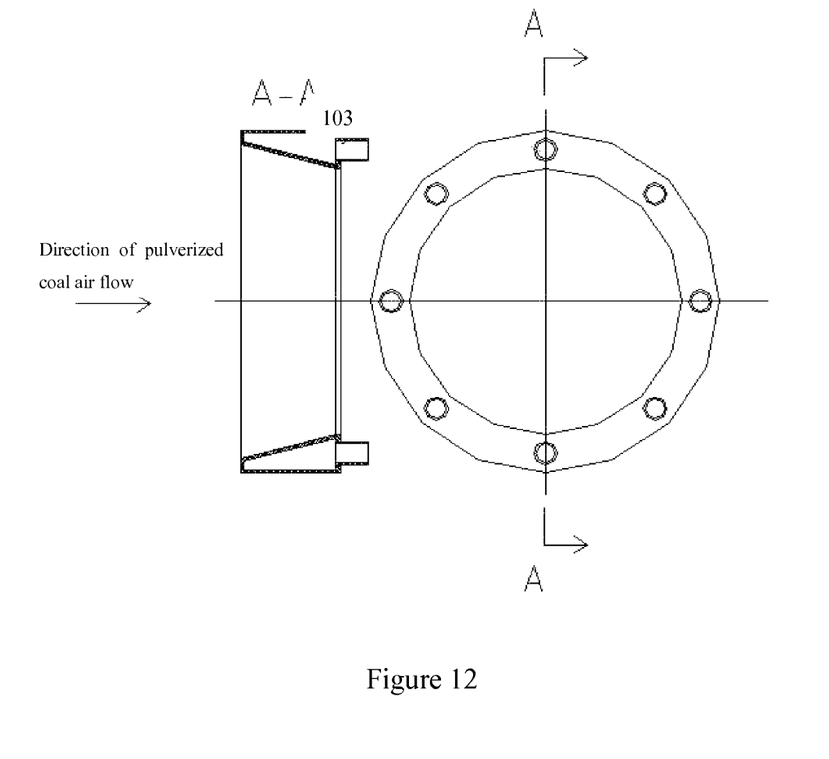
FIG. 12 is a section view of the oxygen duct structure.

As shown in FIG. 12, the distinction between the embodiment and the embodiment 1 is that cross sections of the oxygen ducts 3, 4 and 8 are trapezoidal, walls of the oxygen ducts 3, 4 and 8 against the direction of the pulverized coal air flow are provided with eight oxygen nozzles 103, and oxygen enters the burner through the oxygen nozzles 103 to mix with pulverized coal.

While the invention has been described in detail and with reference to the preferred embodiments, it is to be understood that the invention is not restricted thereto. It will be apparent to those skilled in the art that various changes and modifications can be made therein in accordance with the disclosure. Therefore, scope of the invention is to be restricted only by the appended claims.

The invention claimed is:

1. A plasma oil-free ignition system in oxygen enriched environment, comprising:
   a plasma generator (1);
   a burner (2) having an output end;
   a first oxygen duct (3);
   a second oxygen duct (4);
   a third oxygen duct (8); and
   a first sleeve (9) and a second sleeve (10) arranged in the burner (2);
   wherein the first sleeve (9), the second sleeve (10), and the burner (2) are coaxially arranged, the first sleeve is arranged within the second sleeve;
   wherein the first sleeve (9) has a first left end portion and a first right end portion, the first right end portion is closer to the output end of the burner (2), the left end portion is further away from the output end of the burner (2), a first annular duct is peripherally formed on the inner wall of the left end portion and is protruded from the inner wall of the left end portion, the first oxygen duct (3) is connected to the first duct of the first sleeve, the first annular duct has a side wall facing the output end of the burner, and a first annular groove (101) is formed along the side wall of the first annular duct, such that when the first oxygen duct supplies oxygen to the first annular duct, the oxygen enters into the first sleeve through the first annular groove (101);
   wherein the second sleeve (10) has a second left end portion and a second right end portion, the second right end portion is closer to the output end of the burner (2), and the second left end portion is further away from the output end of the burner (2), a second annular duct is peripherally formed on the inner wall of the second left end portion and is protruded from the inner wall of the second left end portion, the second oxygen duct (4) is connected to the second annular duct of the second sleeve, the second annular duct has a side wall facing the output end of the burner (2), and a second annular groove (101) is formed along the side wall, such that when the second oxygen duct (4) supplies oxygen to the second annular duct, the oxygen enters into the second sleeve through the second annular groove (101); and
   wherein a third annular duct is peripherally formed on the inner wall of the burner (2) and is protruded from the inner wall of the burner (2), the third annular duct has a side wall facing the output end of the burner, and a third annular groove is formed along the side wall, such that when the third oxygen duct (8) supplies oxygen to the third annular duct, the oxygen enters into the burner (2) through the third annular groove.

2. The plasma oil-free ignition system in oxygen enriched environment according to claim 1, characterized in that the plasma generator (1) is coaxially or radially inserted into the sleeve group.

3. The plasma oil-free ignition system in oxygen enriched environment according to claim 2, characterized in that cross sections of the sleeves (9, 10) are circular or rectangular.

4. The plasma oil-free ignition system in oxygen enriched environment according to claim 2 characterized in that cross sections of the oxygen ducts (3, 4, 8) are circular, oval, rhombic, triangular, wedged or trapezoidal.

5. The plasma oil-free ignition system in oxygen enriched environment according to claim 2 characterized in that walls of the oxygen ducts (3, 4, 8) toward the direction of the pulverized coal air flow are planes or arc walls.

6. The plasma oil-free ignition system in oxygen enriched environment according to claim 2 characterized in that a wear resistant metal, or wear resistant ceramics or a wear resistant cast steel material is overlaid to walls of the oxygen ducts (3, 4, 8) toward the direction of the pulverized coal air flow.

7. The plasma oil-free ignition system in oxygen enriched environment according to claim 2 characterized in that an angle of 0°-80° is formed between injection direction of the oxygen nozzles and flow direction of the pulverized coal air flow.

8. The plasma oil-free ignition system in oxygen enriched environment according to claim 2, characterized in that a back air flow oxygen duct (11) is arranged at a nozzle of the burner (2).

9. The plasma oil-free ignition system in oxygen enriched environment according to claim 8, characterized in that wall of the back air flow oxygen duct (11) toward direction of a furnace is provided with multiple annular grooves (101), or provided with multiple openings (102) or multiple oxygen nozzles (103).

10. The plasma oil-free ignition system in oxygen enriched environment according to claim 1, characterized in that flow of oxygen in the oxygen ducts (3, 4, 8, 11) is adjustable.

* * * * *